United States Patent
Peric

(10) Patent No.: US 7,236,746 B2
(45) Date of Patent: Jun. 26, 2007

(54) METHOD AND APPARATUS FOR MEASUREMENT AND IDENTIFICATION OF CO-CHANNEL INTERFERING TRANSMITTERS

(75) Inventor: Sinisa Peric, Bethesda, MD (US)

(73) Assignee: PCTEL, Inc., Chicago, IL (US)

( * ) Notice: Subject to any disclaimer, the term of this patent is extended or adjusted under 35 U.S.C. 154(b) by 537 days.

(21) Appl. No.: 10/771,757

(22) Filed: Feb. 4, 2004

(65) Prior Publication Data

US 2005/0180351 A1   Aug. 18, 2005

(51) Int. Cl.
*H04B 17/00*   (2006.01)
*H04B 7/00*   (2006.01)
*H03C 1/62*   (2006.01)
*H04Q 7/20*   (2006.01)

(52) U.S. Cl. .................. 455/67.11; 455/115.1; 455/423; 455/450; 455/500; 455/501; 370/241; 370/347; 370/337

(58) Field of Classification Search .......... 455/67.11, 455/115.1, 423, 450, 500, 501; 370/241, 370/347, 337
See application file for complete search history.

(56) References Cited

U.S. PATENT DOCUMENTS

| | | | |
|---|---|---|---|
| 5,179,722 A | 1/1993 | Gunmar et al. ............. | 455/33.1 |
| 6,137,991 A | 10/2000 | Isaksson ..................... | 455/67.1 |
| 6,192,244 B1 * | 2/2001 | Abbadessa .................. | 455/436 |
| 6,349,207 B1 * | 2/2002 | Monot et al. ............... | 455/502 |
| 6,356,763 B1 | 3/2002 | Kangas et al. .............. | 455/456 |
| 6,418,175 B1 | 7/2002 | Pukkila et al. .............. | 375/347 |
| 6,470,185 B2 | 10/2002 | Kangas et al. .............. | 455/456 |
| 6,480,718 B1 | 11/2002 | Tse ............................. | 455/446 |
| 2001/0016490 A1 * | 8/2001 | Martin-Leon et al. ..... | 455/67.1 |
| 2001/0034208 A1 | 10/2001 | Kline et al. ................. | 455/67.1 |
| 2001/0044311 A1 | 11/2001 | Larsson et al. ............. | 455/456 |
| 2002/0004400 A1 | 1/2002 | Fischer et al. .............. | 455/456 |

(Continued)

FOREIGN PATENT DOCUMENTS

WO     WO 01/59936     8/2001

OTHER PUBLICATIONS

"Full-coverage, mobile and automatic measurement of GSM Interference", GSM interference Analyzer ROGER (TS9958); News from Rohde & Schwarz #168 (2000/III).

(Continued)

*Primary Examiner*—Lara N. Le
*Assistant Examiner*—Wen Huang
(74) *Attorney, Agent, or Firm*—Welsh & Katz, Ltd.

(57) ABSTRACT

A methodology and apparatus for measurement and identification of co-channel interferers in a GSM cellular wireless communication network is provided as part of a network survey (e.g., drive test). Repetitive time-of-arrival measurements of detected FCCH bursts on a given frequency channel are made in conjunction with power level and C/I ratio measurements of such FCCH bursts. Successful FCCH burst detection triggers SCH detection/decoding and successful SCH decoding triggers BCCH detection/decoding. Successfully decoded SCH BSIC data and possibly BCCH CellId data is associated with the corresponding FCCH burst information based on their time-of-arrival. This association is possible even with the FCCH bursts for which SCH and BCCH decoding was not successful due to the interference or some other impairment. It is sufficient to successfully decode SCH/BCCH only once per cell during the network survey in order for all detected FCCH bursts coming from this cell to be properly assigned to it. This does not requiring a priori knowledge of the network configuration or its geographical layout. Such methodology (and apparatus) can readily be adapted for other Time-Division-Multiple-Access (TDMA) cellular wireless networks.

53 Claims, 5 Drawing Sheets

U.S. PATENT DOCUMENTS

| | | |
|---|---|---|
| 2002/0118730 A1 | 8/2002 | Svensson et al. ............ 375/150 |
| 2003/0171132 A1 | 9/2003 | Ho et al. ..................... 455/522 |
| 2003/0174671 A1 | 9/2003 | Chen .......................... 370/329 |
| 2004/0132457 A1* | 7/2004 | Sanders et al. ............. 455/450 |

OTHER PUBLICATIONS

"Interference in Mobile Cellular CDMA Forward Traffic Channels"; A.L. Garrett, T.G. MacDonald, D.L. Noneaker, M.B. Pursley, J.M. Shea; Clemson University, SC.

"Simulation software accelerates in-building deployment"; Wireless Web;Sep. 23, 2003 Author: Michael Kuhn.

"From the Inside Out:Vendor Guides Carriers Toward Indoor Coverage" Telephony.Online; Telephony, Jan. 26, 1998.

"Optimizing In-Building Coverage"; Wireless Review, Mar. 1, 1998 Authors: James Kobielus, Gray Somerville and Todd Baylor.

"Deployment, Optimization, and Maintenance of UMTS Networks with Wizard", Agilent Technologies, Copyright 2000.

"Simulation Results for Parallel GSM Synchronisation"; TSG-RAN Working Group 1 Meeting #4; Yokohama, Japan; Apr. 19-20, 1999; Source: Siemens.

International Search Report for PCT/US05/02805.

* cited by examiner

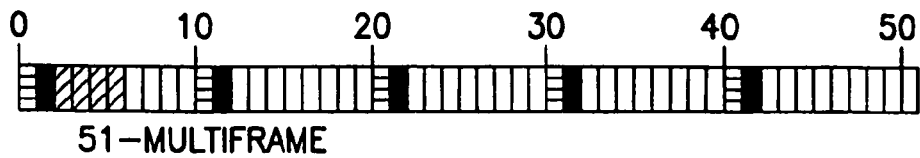

51-MULTIFRAME

▤ FCCH USES EVERY 10th SLOT IN A CYCLE
(A SLOT IN FRAMES 0 10 20 30 40)

■ SCH USES A SLOT ONE FRAME AFTER EACH FCCH SLOT
(A SLOT IN FRAMES 1, 11, 21, 31, 41)

▨ BCCH IN FRAMES 2,3,4,5

FIG.3

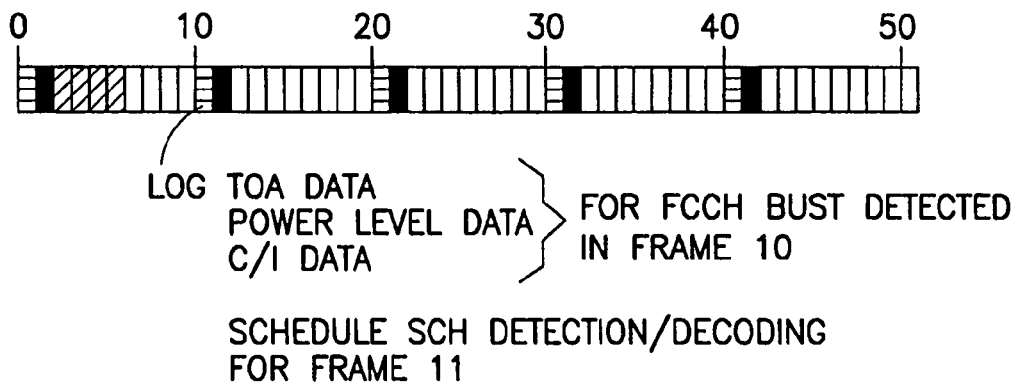

LOG TOA DATA
POWER LEVEL DATA ⎫ FOR FCCH BUST DETECTED
C/I DATA          ⎭ IN FRAME 10

SCHEDULE SCH DETECTION/DECODING
FOR FRAME 11

FIG.4A

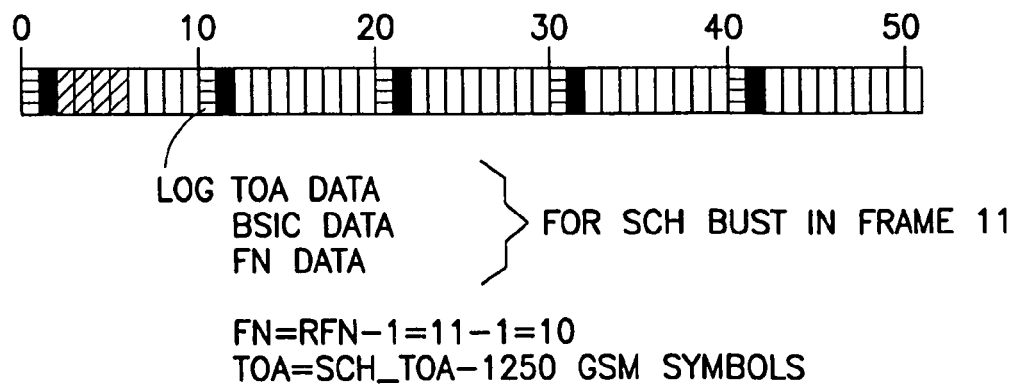

LOG TOA DATA
BSIC DATA ⎫ FOR SCH BUST IN FRAME 11
FN DATA   ⎭

FN=RFN−1=11−1=10
TOA=SCH_TOA−1250 GSM SYMBOLS

SCHEDULE BCCH DETECTION/DECODING FOR
FRAMES 2,3,4,5 IN NEXT 51−MULTIFRAME

METHOD AND APPARATUS FOR MEASUREMENT AND IDENTIFICATION OF CO-CHANNEL INTERFERING TRANSMITTERS

BACKGROUND OF THE INVENTION

1. Field of the Invention

This invention relates broadly to cellular wireless communication networks. More particularly, this invention relates to a methodology and systems for identification and measurement of interference in Global System for Mobil Communications (GSM) cellular wireless networks.

2. State of the Art

Because cellular wireless communication networks re-use frequency across geographic areas, all cellular wireless communication networks contain interference (both co-channel and adjacent channel). All modern-day wireless protocols, including the GSM protocol, take this into consideration. However, it is important for cellular network carriers to manage interference to its minimum possible levels because interference within a network reduces capacity (the number of subscribers, or amount of traffic, a network can accommodate). Thus, in order to maximize the amount of revenue a network can generate, maximize quality of service, and to minimize the capital expenditures necessary to support that revenue (i.e. purchasing new base stations), it is critical that the network interference be minimized.

The current solutions for optimizing cellular wireless networks involve a process of gathering network data and processing that data to determine the best possible optimization of network variables to minimize interference. The data can come from a number of sources, but drive testing is the most accurate. Drive testing is the process of driving the roads in a given market with a piece of test equipment that typically includes a laptop computer integrated with a wireless terminal, a GPS receiver and a demodulating scanning receiver. Once the drive test data is collected, the data is typically provided to post-processing tools which apply various mathematical algorithms to the data to accomplish network planning and optimization. An example of post-processing is automatic frequency planning (AFP), where the data is processed to determine the optimal arrangement of frequencies to cell site sectors to minimize network interference. Another post-processing application is automatic cell planning (ACP) which analyzes network variables to aid network engineers in making decisions on how best to minimize interference in the network. For GSM networks, these network variables include: the frequencies per cell site sector, the cell site antenna's height and/or azimuth and/or tilt, the cell site sector's transmission power, cell site locations or new cell site locations, and a host of other variables that impact radio frequency propagation.

When analyzing a cellular wireless system, it is important that such analysis be able to distinguish between signals originating from different base stations. Two phenomena make such separation difficult: co-channel interference and adjacent-channel interference. Co-channel interference occurs when transmitters in a given area use the same frequency channel. Adjacent-channel interference occurs when base stations in a given area transmit on adjacent channels.

A number of techniques have been developed to achieve the stated goal of signal separation. One class of techniques associate signals with transmitting base stations based on the ability to decode base station identifiers (also referred to as color codes) in the transmitted signals. If the base station identifier can be detected, the signal is ascribed to the nearest base station with this base station identifier. These techniques require measuring position of the measurement instrument as well as a priori knowledge of the network geographical layout and the assignments of identifiers to the base stations of the network. Moreover, these techniques are ineffective in the presence of interference (either co-channel interference or adjacent-channel interference) because base station identifiers cannot be detected.

Another technique involves joint-decoding of the color code signal components with channel estimation for each signal path. This technique, which is described in detail in U.S. Pat. No. 6,324,382, relies on accurate estimation of the transmission channel characteristics for the signal paths from each interfering base station. In practice, this technique suffers from poor decoding performance in addition to its low measurement speed.

An improved technique is described in U.S. Patent Application Publication US2001/0034208, published Oct. 25, 2001, commonly assigned to the assignee of the present invention, incorporated by reference herein in its entirety. This technique uses correlation with known signal patterns (for example, synchronization and training sequences), which yields a significant processing gain. This gain allows signal detection in the presence of interference even when its level is substantially below the level of one or more interfering signals. Signal identification (i.e., association with transmitting base stations) is based upon the Global Positioning System (GPS) position of the measurement instrument and time-of-arrival of individual Frequency Correction Channel (FCCH) correlation peaks at different measurement points. The power level of the signal at a given FCCH peak is stored in a database together with its time of arrival. When color code decoding is successful, all instances of the given FCCH peak during its lifetime in the database are back-annotated with the newly-found color code. This technique provides improved signal detection in the presence of interference; however, it requires successful color code decoding associated with a given FCCH peak for the instances of the given FCCH peak to be back-annotated with the decoded color code. Moreover, it is possible for the same color code to be used by different base stations. In this case, the identification of base stations based on color codes may not provide unique base station identification, and thus require complex post processing to resolve such situations. Finally, it relies on the difference between time-of-arrivals for FCCH peaks to identify base stations corresponding thereto in the event that the FCCH peaks never have a color code decoded from them during a given session. Thus, data measured and stored for multiple sessions or with multiple instruments cannot be efficiently associated between them. The present invention builds upon the methodology and apparatus described in U.S. Patent Application Publication US2001/0034208 to provide a more efficient solution and add additional features not described therein.

SUMMARY OF THE INVENTION

It is therefore an object of the invention to provide methodology (and a system based thereon) for base station signal identification and measurement that is effective in the presence of interference without requiring a priori knowledge of the GSM network configuration or its geographical layout.

It is another object of the invention to provide methodology (and a system based thereon) for base station signal identification and measurement that utilizes a GPS-based timing reference for time-of-arrival measurements for detected signal components.

It is a further object of the present invention to provide methodology (and a system based thereon) for base station signal identification and measurement that is suitable for distributed signal acquisition by multiple instruments (or sequential signal acquisition by the same instrument) and that enables subsequent processing of the combined results as if such results were acquired from the same instrument without requiring translation of the timing measurements for such results.

In accord with these objects, which will be discussed in detail below, a methodology (and a system based thereon) for measurement and identification of co-channel interferers in a GSM cellular wireless communication network is provided. The acquisition and analysis of signals occurs as part of a network survey (e.g., drive test). Repetitive time-of-arrival measurements of detected FCCH bursts in a given communication channel are made in conjunction with the measurements of the power level and carrier-to-interference (C/I) ratio of such FCCH bursts. Successful FCCH burst detection triggers Synchronization Channel (SCH) detection/decoding operations for the next frame in the channel, and successful SCH decoding triggers Broadcast Control Channel (BCCH) detection/decoding for subsequent frames in the channel. The BCCH channel carries CellId information that uniquely identifies each base station. Further data analysis operations associate Base Station Identifier Code (BSIC) data and possibly CellId information derived from successful SCH and BCCH decoding operations with the corresponding FCCH burst information. It will be appreciated that this time-of-arrival association is possible even with the FCCH bursts for which decoding was not successful (due to the interference or some other impairment). Note that it is sufficient to successfully decode BSIC/BCCH only once per base station during the network survey in order for all other FCCH bursts coming from this base station to be properly assigned.

It will be appreciated that such methodology (and data analysis systems based thereon) unambiguously identifies FCCH bursts with a given cell in the GSM network without requiring a priori knowledge of the GSM network configuration or its geographical layout. Moreover, such methodology (and apparatus) can readily be adapted for other Time-Division-Multiple-Access (TDMA) cellular wireless networks as set forth herein.

In the preferred embodiment of the invention, GPS timing signals provide a source of synchronization for time-of-arrival measurements. This feature enables multiple data acquisition systems to be mutually synchronized (or the same instrument used in a sequential manner). It also allows the resulting data sets to be combined and used as if they were acquired from the same instrument without requiring translation of the timing measurements for such results. Such synchronized data acquisition systems can be co-located or dispersed during measurement.

The FCCH burst information generated and stored as a result of the data acquisition and analysis described herein may be used for a wide variety of post-processing analyses, including, but not limited to, optimizations, frequency planning, co-channel and adjacent-channel interference analysis, uncovering and troubleshooting interference problems, etc.

Additional objects and advantages of the invention will become apparent to those skilled in the art upon reference to the detailed description taken in conjunction with the provided figures.

BRIEF DESCRIPTION OF THE DRAWINGS

FIG. 3 is a pictorial illustration of a 51-multiframe used for downlink communication from a base station to a mobile unit in a GSM cellular wireless communication network.

FIGS. 4A and 4B are pictorial illustrations of the data analysis operations of FIGS. 1A and 1B for an illustrative 51-multiframe.

DETAILED DESCRIPTION OF THE PREFERRED EMBODIMENT

Figure 1C:
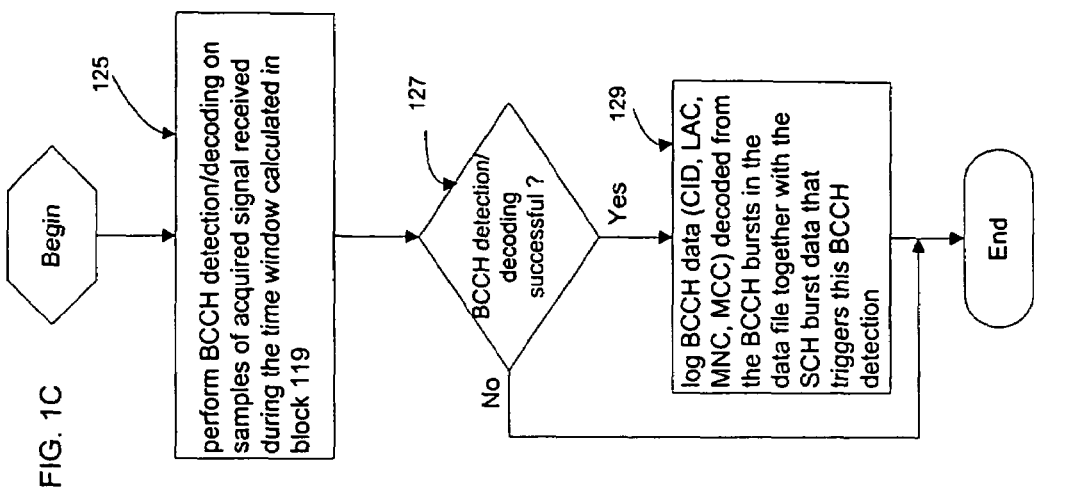
FIGS. 1A, 1B, and 1C are flowcharts describing operations for real-time acquisition and analysis of signals in a GSM cellular wireless communication network in accordance with the present invention.

In accordance with the present invention, acquisition and analysis of signals in a GSM cellular wireless communication network is performed as part of a network survey (e.g., drive test) within the intended coverage zone of the GSM cellular wireless communication network. Such analysis includes repetitive measurements of the time-of-arrival of FCCH bursts in a given communication channel in conjunction with the measurements of the power level and carrier-to-interference ratio (C/I) of such FCCH bursts. Successful FCCH burst detection triggers SCH detection and decoding operations for the next frame in the channel, and successful SCH decoding triggers BCCH detection/decoding for subsequent frames in the channel. The BCCH channel carries information that uniquely identifies each base station. Further data analysis operations associate SCH data (e.g., BSIC) and possibly BCCH data (e.g., CellId, LAC, MNC, MCC as described below) that are derived from successful SCH decoding operations and successful BCCH decoding operations, respectively, with the corresponding FCCH burst information. With such operations, FCCH bursts are unambiguously associated with a given cell in the GSM network even when decoding is not possible due to low C/I, without requiring a priori knowledge of the GSM network configuration or its geographical layout. Such operations enable direct identification of interfering transmitters in the GSM network and enable subsequent post-processing that optimizes frequency reuse of the GSM network that mitigates such interference.

As part of the methodology, one or more wireless data acquisition devices sample relevant frequency channels utilized by the GSM network as part of a survey within the intended coverage zone of the GSM network. The survey may cover a plurality of ground-level measurement points during the course of a drive test through the intended coverage zone of the wireless communication network. The survey may also cover a plurality of above-ground-level measurement points at various places (such as at the center and exterior corners of every fourth floor) within buildings that are located within the intended coverage zone of the network. The relevant frequency channels for the GSM network include the 124 frequency channels, each 200 kHz in width, between 925 MHz and 960 MHz. These frequency channels are used for downlink communication from a base station to a mobile unit in a GSM network. Note that the term "base station" is commonly used interchangeably with the terms "transmitter", "cell" and "sector" in discussing a GSM network. Other relevant radio frequency regions include the PCS band (1930 to 1990 MHz), Cellular band (869 to 894 MHz), and the DCS band (1805 to 1880 MHz). However, only the frequency channels that carry the Broadcast Control Channel (BCCH or C0) are relevant since they contain FCCH, SCH and BCCH information. The signals within the respective GSM frequency channels, which are measured by the wireless data acquisition device as part of the network survey, are analyzed to identify interference components therein. For simplicity of description, only data analysis operations on signals received from a single frequency channel are described below with respect to FIGS. 1A–1C and FIG. 2. One skilled in the art will realize that such data analysis operations will be performed for a plurality of received frequency channels as part of the desired network analysis operations.

Figure 1B:
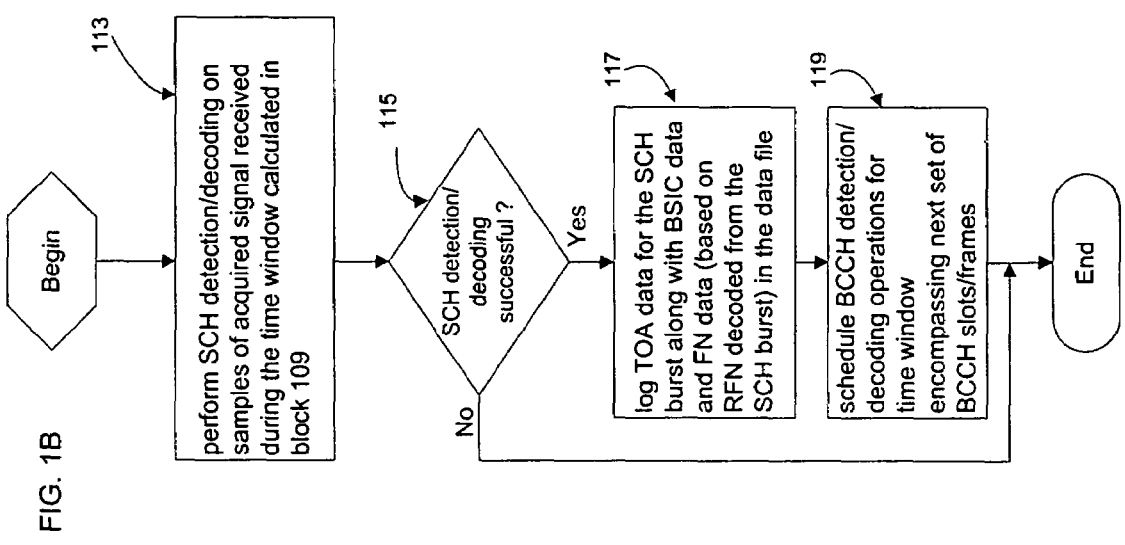
Figure 1A:
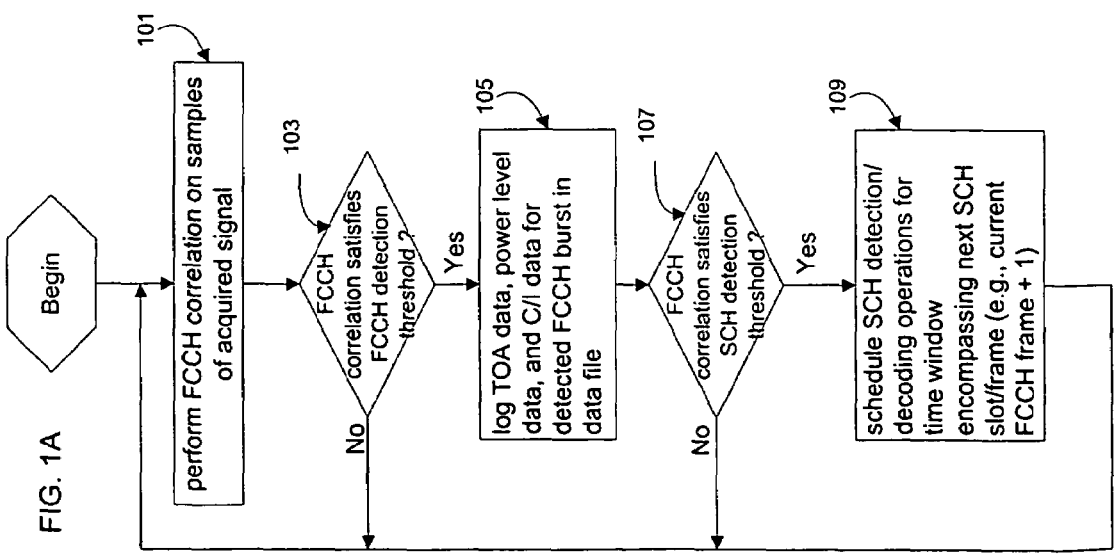

Referring to FIG. 1A, the analysis begins in block 101 by correlating the received signal with the FCCH burst waveform to identify one or more correlation peaks therein. The FCCH burst waveform, which is a 142-bit-long piece of a sine wave of fixed frequency, is well suited for such correlation because its detection can be performed even in the presence of strong signals.

Note that each base station of the GSM network broadcasts a 51-multiframe in a downlink communication channel of the GSM frequency spectrum. As shown in FIG. 3, the 51 multi-frame can be logically partitioned into a set of five "10-frames" followed by an "odd frame". Each of the five "10-frames" has one FCCH burst in a fixed position therein (e.g., an FCCH burst is transmitted in frames 0, 10, 20, 30, 40). The "odd frame" does not have an FCCH burst. An SCH burst occurs in the frames subsequent to the FCCH frames (e.g., an SCH burst is transmitted in frames 1, 11, 21, 31, 41). Each SCH burst includes a 64-bit extended training sequence in addition to two sets of 39 data bits. The data bits of the SCH burst encode the Base Station Identifier Code (BSIC, also called color code) along with the Reduced TDMA Frame Number (RFN), which identifies the current frame number of the SCH burst in the 51-multiframe. BCCH frames are transmitted in frames 2, 3, 4 and 5 of the 51-multiframe. The BCCH frames encode control information including a Cell Identity (CellId), Location Area Code (LAC), Mobile Network Code (MNC) and Mobile Country Code (MCC) assigned to the base station transmitting the 51-multiframe.

In block 103, it is determined if the FCCH correlation operations of block 101 satisfy an FCCH detection threshold. The FCCH detection threshold is selected to provide a measure indicating that the results of the correlation operations of block 101 (e.g., a correlation peak therein) correspond to an actual FCCH burst with a desired level of certainty. If the FCCH detection threshold is satisfied (i.e., an FCCH burst has been detected), the operations continue to block 105; otherwise the operations return to block 101 to perform additional FCCH correlation operations.

In block 105, time-of-arrival (TOA) data, power level data and carrier-to-interference ratio (C/I) data are calculated for the detected FCCH burst and logged in a data file preferably as part of one or more data entries associated with the detected FCCH burst. The TOA data for the detected FCCH burst is preferably referenced to a timing reference signal with a period of one or more GSM 51-multiframes. Since the FCCH information, SCH information and BCCH information repeats each 51-multiframe, the TOA data are calculated modulo 51-multiframe (e.g., with there being 63750 GSM symbols in the 51-multiframe, the TOA data ranges from 0 to 63749 GSM symbols). The power level data for the detected FCCH burst is preferably derived from the absolute power level (in dBm) of the correlation peak. The C/I data for the detected FCCH burst is preferably derived from the ratio of the absolute power level of the correlation peak over the total interference power (in dB). The total interference power for the detected FCCH burst is equal to the total power in the channel at the location of the correlation peak minus the power of the FCCH burst. The timing reference signal is generated by an internal time-based generator in the wireless data acquisition device. Preferably, this timing reference signal is synchronized to a GPS timing signal. In this configuration, the GPS timing signal provides a common source of synchronization for the time-of-arrival measurements for the detected FCCH, SCH and BCCH bursts as described below in more detail.

In block 107, it is determined if the FCCH correlation operations of block 101 satisfy an SCH detection threshold. The SCH detection threshold is selected to provide a prediction (with a desired level of certainty) that successful SCH detection and decoding will be accomplished in the next frame. If the SCH detection threshold is satisfied, the operations continue to block 109; otherwise the operations return to block 101 to perform additional FCCH correlation operations.

In block 109, the TOA of the detected FCCH burst is used to define a time window (as defined by the internally-generated time reference signal) that encompasses the next SCH frame. The next SCH frame will occur in the next frame of the 51-multiframe (e.g., the current frame of the detected FCCH burst+1 frame). SCH detection and decoding operations are scheduled to be performed in this time window. In a multi-threaded computing environment, such scheduling may be accomplished by spawning a processing thread that executes the operations of FIG. 1B. After block 109, the operations return to block 101 to perform additional FCCH correlation operations.

FIG. 1B illustrates the SCH detection and decoding operations triggered by the operations of FIG. 1A. In block 113, SCH detection and decoding operations are carried out on the samples of the acquired signal that are received during the time window calculated in block 109. Preferably, the SCH detection and decoding is carried out by analyzing these samples to identify the 64-bit extended training sequence of the SCH burst, using the time-of-arrival and bit position of the identified training sequence to locate the data bits of the SCH burst within these samples, and demodulating and decoding these data bits to generate the BSIC data and RFN data encoded by the SCH burst.

In block 115, it is determined if the SCH detection and decoding operations of block 113 were successful. If so, the operations continue to blocks 117 and 119; otherwise, the operations end.

In block 117, TOA data for the SCH burst, the BSIC data decoded from the SCH burst in block 113, and a frame number FN (based on the RFN data decoded from the SCH burst in block 113) are logged into the data file preferably as part of one or more data entries associated with the detected SCH burst. The TOA data for the detected SCH burst is referenced to the same timing reference signal that is used to generate the TOA data for the FCCH bursts (e.g., the timing reference signal with a period of one or multiple GSM 51-multiframes as described above). Preferably, both the TOA data and the FN data for the detected SCH burst are normalized to the preceding FCCH frame. Such normalization is accomplished by subtracting one frame (1250 GSM symbols) from the TOA of the detected SCH burst to form the normalized TOA data for the SCH burst, and by subtracting one frame from the RFN to form the FN for the SCH burst. Because the time-of-arrival measurement for the SCH burst is more accurate than the time-of-arrival measurement for the preceding FCCH burst, the data file may be updated to substitute the normalized TOA data for the SCH burst for the TOA data for the FCH burst in the preceding frame. This can be accomplished even if SCH decoding was not successful.

In block 119, the TOA and RFN of the detected SCH burst is used to define a time window (as defined by the internally-generated time reference signal) that encompasses the next set of BCCH frames. The next set of BCCH frames will occur at time offsets from the detected SCH burst that depend on the position of the SCH burst in the 51-multiframe as shown in FIG. 3. The RFN of the detected SCH burst is used to construct the proper time offset for this window. BCCH detection and decoding operations are scheduled to be performed in this time window. In a multi-threaded computing environment, such scheduling may be accomplished by spawning a processing thread that executes the operations of FIG. 1C. After block 119, the operations of FIG. 1B end.

FIG. 1C illustrates the BCCH detection and decoding operations triggered by the operations of FIG. 1B. Such operations are useful because it is possible to receive SCH frames from multiple base stations with the same BSIC data encoded therein. However, the BCCH information (CellId, LAC, MNC, MCC) transmitted in the BCCH frames by these base stations (as part of a BCCH type 3 message encoded therein) unambiguously identify each one of these base stations. Such BCCH information can be used to uniquely identify each transmitting base station.

The operations of FIG. 1C begin in block 125 whereby BCCH detection and decoding operations are carried out on the samples of the acquired signal that are received during the time window calculated in block 119. Preferably, the BCCH detection and decoding is carried out by analyzing these samples to identify the training sequence of the BCCH bursts, using the time-of-arrival and bit position of the identified training sequence to locate the data bits of the BCCH bursts within these samples, and decoding these data bits to generate the BCCH information (CellId, LAC, MNC, MCC assigned to the base station transmitting the 51-multiframe) encoded therein.

In block 127, it is determined if the BCCH detection and decoding operations of block 125 were successful. If so, the operations continue to blocks 129; otherwise, the operations end.

In block 129, the BCCH data (CellId, LAC, MNC, MCC) decoded from the set of BCCH bursts in block 125 is logged into the data file preferably as part of one or more data entries associated with the detected BCCH burst set. Preferably, the BCCH data is stored in the data file as part of one or more data entries associated with the one or more decoded SCH bursts that triggered the BCCH detection and decoding operations from which the BCCH data is derived. After block 129, the operations of FIG. 1C end.

The data file generated as a result of the real-time data acquisition and analysis operations of FIGS. 1A through 1C preferably include the following data components for each FCCH burst detected in block 103:

TOA data for the detected FCCH burst (this TOA data is preferably referenced to the internal timing reference signal that is synchronized with a GPS signal and that has a period of one or more GSM 51-multiframes);

power level data for the detected FCCH burst (the Power level data is preferably derived from the absolute power level (in dBm) of the correlation peak;

carrier-to-interference ratio (C/I) data for the detected FCCH (the C/I data for the FCCH burst is preferably derived from the ratio of the power level of the correlation peak over the total interference power (in dB)).

Furthermore, the data file generated as a result of the real-time data acquisition and analysis operations of FIGS. 1A through 1C preferably include the following data components for each SCH burst that is detected and successfully decoded in block 113:

TOA data for the SCH burst (this TOA data is preferably referenced to the internal timing reference signal that is synchronized with a GPS signal and that has a period of one or more GSM 51-multiframes and normalized to the preceding FCCH frame);

BSIC data and FN data for the SCH burst (the FN data is based on the RFN data decoded from the SCH burst and is normalized to the preceding FCCH frame); and BCCH information (CellId, LAC, MNC, and MCC) for this SCH burst if successfully decoded in block 125.

Figure 2:
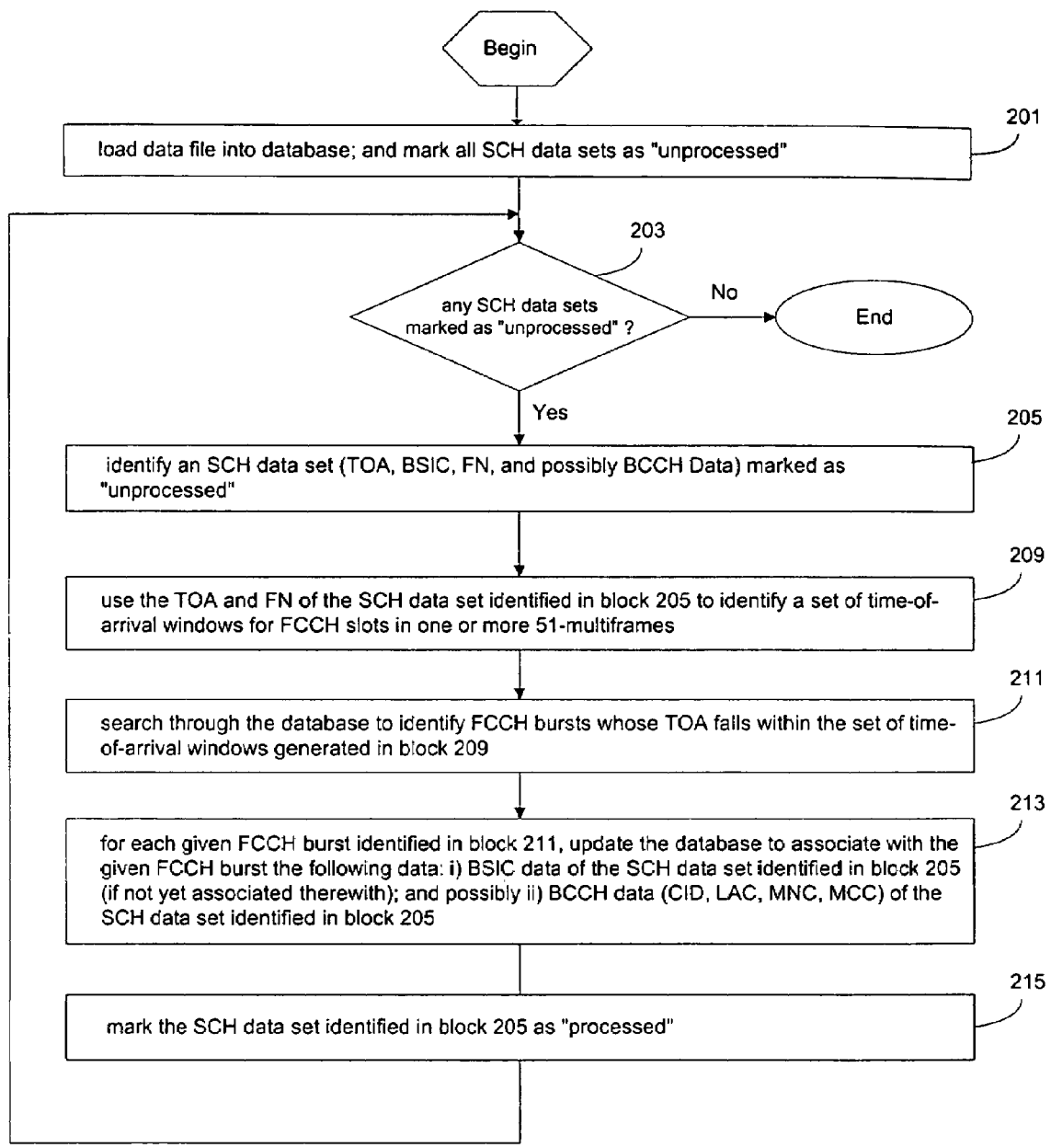
FIG. 2 is a flow chart describing data processing operations performed on the data captured by the real-time data acquisition and analysis operations of FIGS. 1A through 1C in accordance with the present invention.

In accordance with the present invention, the data file generated as a result of the real-time data acquisition and analysis operations of FIGS. 1A through 1C is subjected to the "off-line" data analysis operations of FIG. 2. Such "off-line" data analysis associates the SCH data (e.g., BSIC data) and possibly BCCH data (e.g., CellId, LAC, MNC, MCC), with corresponding FCCH burst information. With such operations, FCCH bursts are unambiguously associated with a given cell in the GSM network without requiring a priori knowledge of the GSM network configuration or its geographical layout. This association is possible even with the FCCH bursts for which decoding was not successful (due to the interference or some other impairment).

The operations of FIG. 2 begin in block 201 wherein the data file generated in the real-time data acquisition operations of FIGS. 1A–1C is loaded into a database, and the SCH data (e.g., TOA data, frame number FN, BCCH information) pertaining to each detected SCH burst, which is referred to herein as a SCH data set, is marked with an "unprocessed" flag.

In block 203, it is determined if there is any SCH data set stored in the database that is marked as "unprocessed". If so, the operation continues to block 205. If not (i.e., all SCH data sets have been processed), the operations of FIG. 2 end.

In block 205, one of the SCH data sets that are marked as "unprocessed" is identified, and the operations continue to block 209.

In block 209, the TOA data and FN data of the SCH data set identified in block 205 is used to generate a set of five time-of-arrival windows (in the internally-generated reference timing signal used during the real-time data acquisition and analysis operations of FIGS. 1A–1C) for FCCH slots in the received signal. When the reference timing signal has a period of one or multiple 51-multiframes as described above, the five time-of-arrival windows will correspond to the five FCCH slots in multiple 51-multiframes. In fact, the time-of-arrival windows will cover the five FCCH slots in each one of the 51-multiframes transmitted by a base station during the data acquisition and analysis operations carried out as part of the network survey.

In block 211, the database is searched to identify FCCH bursts whose TOA data component falls within the set of five time-of-arrival windows generated in block 209.

In block 213, for each given FCCH burst identified in block 211 as falling within the set of five time-of-arrival windows, the database is updated to associate the BSIC data for the SCH data set identified in block 205 with the data components of the given FCCH burst (if not yet associated therewith). In addition, in the event that there is BCCH information (CellId, LAC, MNC, MCC) associated with the SCH data set identified in block 205, the database is updated to associate such BCCH information with the data components of the given FCCH burst (if not yet associated therewith).

Finally, in block 215, the SCH data set identified in block 205 is marked as "processed" and the operations return to block 203 to continue analysis of "unprocessed" SCH data sets.

Advantageously, the "off-line" data analysis operations of FIG. 2 associates SCH data (e.g., BSIC data) and possibly BCCH data (e.g., CellId, LAC, MNC, MCC) with corresponding FCCH burst information over multiple 51-multiframes transmitted by a base station during the data acquisition and analysis operations carried out as part of the network survey. With such operations, FCCH bursts are unambiguously associated with a given cell in the GSM network without requiring a priori knowledge of the GSM network configuration or its geographical layout. It will be appreciated that this time-of-arrival association is possible even with the FCCH bursts for which decoding was not successful (due to the interference or some other impairment). Note that it is sufficient to successfully decode BSIC/BCCH only once per base station during the network survey in order for all other FCCH bursts coming from this base station to be properly assigned.

Figure 4C:
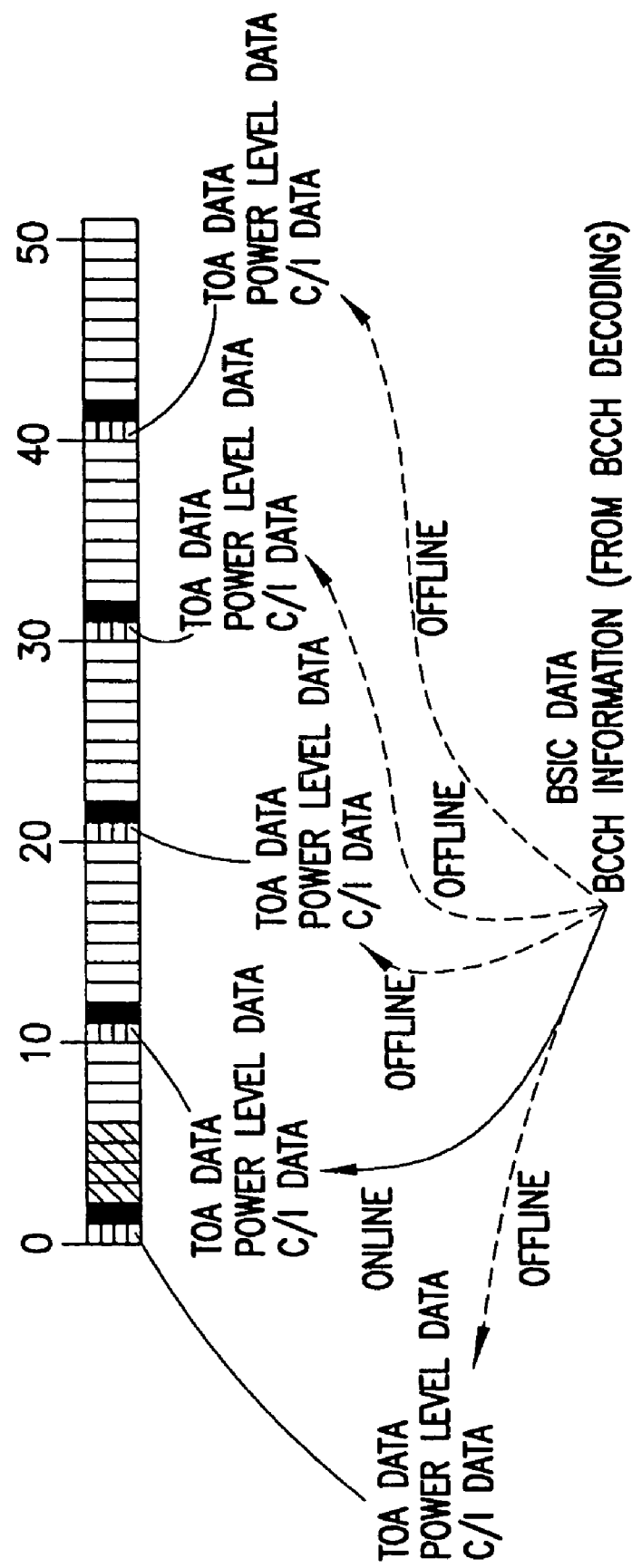
FIG. 4C is a pictorial illustration of the data analysis operations of FIG. 2 for an illustrative 51-multiframe.

Illustrations of the real-time processing carried out as part of FIGS. 1A–1C are shown in FIGS. 4A-4B, and an illustration of the off-line processing carried out as part of FIG. 2 is shown in FIG. 4C. In FIG. 4A, an FCCH burst is detected in frame 10 of a 51-multiframe. At this time, the data acquisition device has yet to determine the 51-multiframe position of the FCCH burst. The data acquisition device logs the TOA data, power level data and C/I data for the FCCH burst in the data file, and schedules SCH detection and decoding for the next frame (which is frame 11) in the 51-multiframe. In FIG. 4B, the SCH detection and decoding operations detect and decode the SCH burst in frame 11 of the 51-multiframe. The RFN data of the decoded SCH burst is used to generate a frame number FN of the corresponding FCCH burst (FN =RFN−1). The data acquisition device logs the TOA data, BSIC data, and frame number FN of the decoded SCH burst into the data file, and schedules BCCH detection and decoding for the next BCCH frame set (frames 2,3,4,5 in the next 51-multiframe). In FIG. 4C, the "offline" data analysis associates the BSIC data (and possibly the BCCH information) for a given SCH data set (the SCH data set decoded from frame 11) with the data components of the FCCH bursts detected within the same 51-multiframe. Such operations may be readily extended to associate the BSIC data (and possibly the BCCH information) for the SCH data set of frame 11 with the data components of the FCCH bursts detected within other 51-multiframes (e.g., previous 51-multiframes and/or subsequent 51-multiframes).

Figure 5:
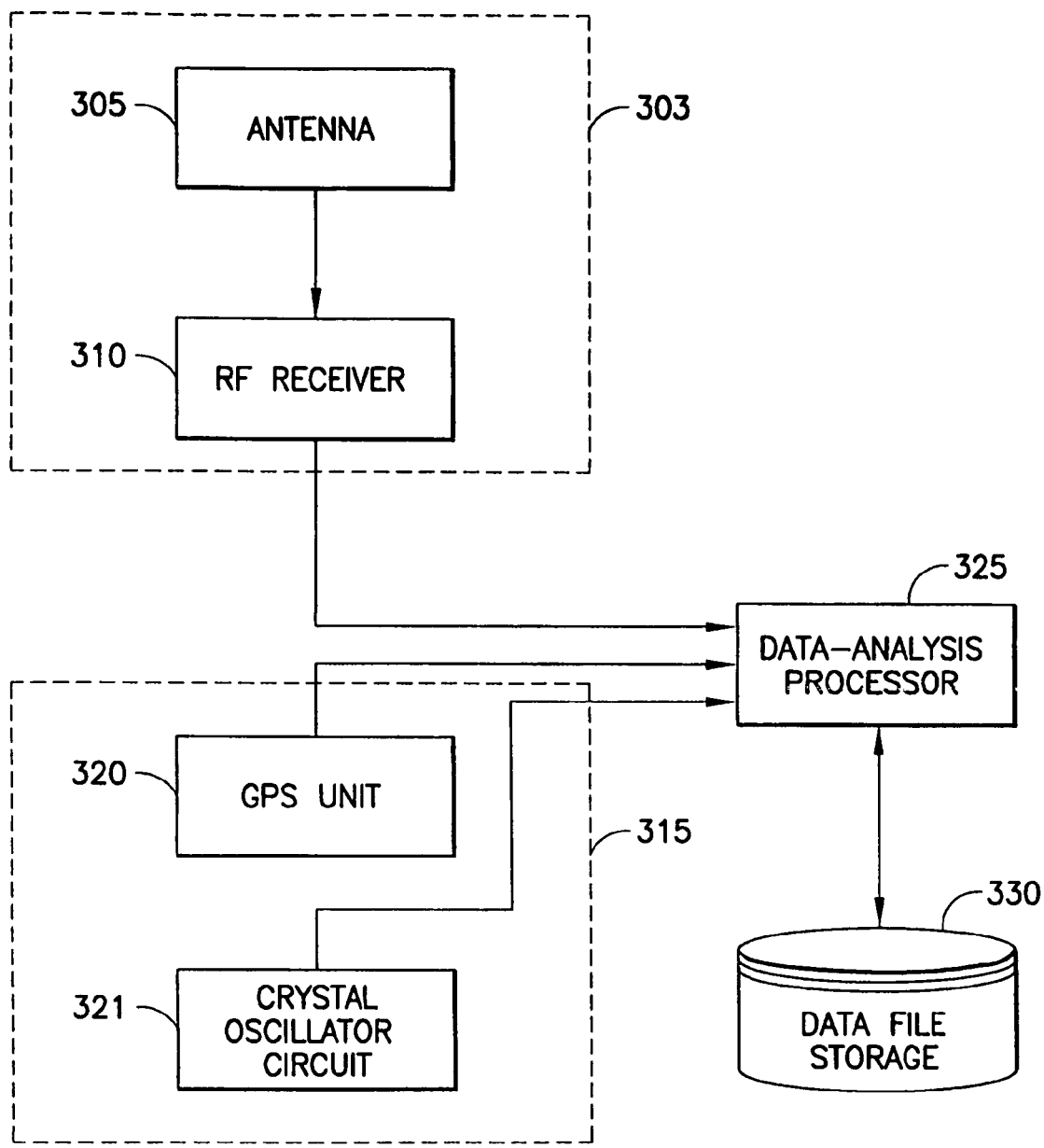
FIG. 5 is a block diagram of the components of a wireless data acquisition and analysis system for carrying out the operations of FIGS. 1A–1C and FIG. 2 in accordance with the present invention.

Referring to FIG. 5, a block diagram of the components of an exemplary system that carries out the data acquisition and analysis operations of FIGS. 1A through 1C is shown. A wireless receiver device 303 includes an antenna 305 in addition to an RF receiver 310 that is tuned to receive a particular frequency channel. The RF receiver 310 produces a signal that is received at the antenna 305 within the tuned frequency channel, and coverts the received signal into digital form. The data analysis 325 receives the signal (in digital form) output from the RF receiver 310 and reference timing signals output from a time reference signal generator 315. Preferably, the reference timing signals include a GPS signal from an internal GPS unit 320 in addition to a reference timing signal output from a crystal oscillator circuit 321. Note that for simplicity of description, the system of FIG. 5 is shown with separate and distinct data paths between the data analysis processor 325 and the receiver device 303, the GPS unit 320 and the crystal oscillator circuit 315, respectively. One skilled in the art will realize that alternate data interface configurations may be used between these components as is well known in the electronic arts. The data analysis processor 325 performs the real-time data analysis operations as described above with respect to FIGS. 1A–1C, and stores the results of such operations in a data file in the data file storage mechanism 330 (e.g., hard disk drive or other form of persistent data storage) coupled thereto. The data analysis processor 325 interfaces to a computer processing platform (not shown) to transfer the resultant data file to a database realized on the computer processing platform. The computer processing platform preferably performs the "off-line" data analysis operations on the data components stored in the database as described above with respect to FIG. 2. It is also contemplated that the functionality of the data analysis processor 325 and the computer processing platform performing the "off-line" data analysis operations may be merged into a common processing system. If this common processing system is powerful enough it might be able to perform all the processing in "on-line" fashion.

The reference timing signals generated by the timing signal generator 315 (and used as the basis to derive time-of-arrival of the various bursts) are preferably achieved via a GPS timing signal provided by the internal GPS unit 320 as is well known. Because it is often problematic to receive GPS signals within the interior spaces of buildings, the wireless data acquisition device preferably includes a crystal oscillator circuit 321 that generates a timing reference signal during in-building measurements. This timing reference signal is synchronized to the GPS-based timing reference signal. In order to provide such synchronization, the initial operation of the crystal oscillator circuit 321 is synchronized to a GPS timing signal. This initial synchronization may occur outside a building (typically at or near ground-level prior to entering a building) or near a window inside a building. Once synchronized, the crystal oscillator circuit maintains an accurate timing reference which is synchronized to the GPS timing reference. In this manner, GPS timing signals provide a common source of synchronization for the time-of-arrival measurements acquired by the device. For such purposes, a crystal oscillator of high stability may be used to realize the internal time signal generator of the mobile wireless data acquisition device. Alternatively, a rubidium standard timing signal generator or any other high stability timing reference may be used.

Also note that by using GPS timing signals to provide a source of synchronization for time-of-arrival measurements, multiple data acquisition systems can be mutually synchronized (or the same instrument can be used in a sequential manner) and the resulting data sets can be combined and used as if they were acquired from the same instrument without requiring translation of the timing measurements for such results. Such synchronized data acquisition systems can be co-located or dispersed during measurement.

The database generated and stored as a result of the data acquisition and analysis described herein may be used for a wide variety of post-processing analyses, including, but not limited to, optimizations, frequency planning, co-channel and adjacent-channel interference analysis, etc.

There have been described and illustrated herein an illustrative embodiment of methodology (and data analysis systems based thereon) for acquiring and analyzing signals in a GSM cellular wireless communication network as part of a network survey (e.g., drive test) of the intended coverage zone of the GSM cellular wireless communication network. Such analysis includes repetitive measurements of the time-of-arrival of FCCH bursts in a given communication channel in conjunction with the measurements of the power level and carrier-to-interference ratio (C/I) of such FCCH bursts. Successful FCCH burst detection triggers SCH detection and decoding operations for the next frame in the channel, and successful SCH decoding triggers BCCH detection/decoding for subsequent frames in the channel. Further data analysis operations associate SCH data (e.g., BSIC) and possibly BCCH data (e.g., CellId, LAC, MNC, MCC) that are derived from successful SCH decoding operations and successful BCCH decoding operations, respectively, with the corresponding FCCH burst information over multiple 51-multiframes transmitted by a base station during the data acquisition and analysis operations carried out as part of the network survey. With such operations, FCCH bursts are unambiguously associated with a given cell in the GSM network without requiring a priori knowledge of the GSM network configuration or its geographical layout even when SCH information and BCCH information cannot be decoded. In fact, it is enough to decode an SCH burst and BCCH burst only once in order to associate all of the FCCH bursts for a given transmitter (cell, base station).

While particular embodiments of the invention have been described, it is not intended that the invention be limited thereto, as it is intended that the invention be as broad in scope as the art will allow and that the specification be read likewise. For example, the data analysis operations (or any part thereof) that are described herein as part of "offline" analysis can be executed as part of the real-time data acquisition and analysis operations. These modifications substantially increase the computational complexity of the operations that are to be executed in real-time, and thus require high performance computation engines that are capable of handling such computational burdens. In this configuration, the methodology and apparatus can be readily adapted to display in real-time the absolute power level and/or relative power level for each FCCH burst detected by the apparatus. As BSIC information and possibly BCCH information are detected and associated with a given FCCH burst, the display is updated in real-time to display this information along with the power level of the FCCH burst. Also, as the measured power level of each FCCH burst varies over time, the display is updated in real-time to depict the changing power level. In addition, while the application of the methodology to particular network architecture(s) (e.g., the GSM network architecture) has been disclosed, it will be appreciated that the methodology can be readily adapted for use with any TDMA (Time Division Multiple Access) network wherein known signal patterns (for example, synchronization and training sequences) that can be detected in the presence of interference as well as multi-part base station identifier information are transmitted by the base stations of the network over the time-divided channels of the network. Moreover, while the preferred embodiment of the present invention utilizes synchronized time references based on GPS signals, it is possible that the burst data may be collected and correlated in conjunction with other time references. It will therefore be appreciated by those skilled in the art that yet other modifications could be made to the provided invention without deviating from its spirit and scope as claimed.

What is claimed is:

1. A method for measurement and identification of base stations transmitting on the same channel, thus interfering with each other, in a GSM cellular wireless network wherein a plurality of base stations each transmit a 51-multiframe signal including a plurality of FCCH bursts, a plurality of SCH bursts and a plurality of BCCH bursts, the method comprising:
   a) receiving signals within the intended coverage zone of the GSM cellular wireless network;
   b) correlating the received signals with an FCCH burst waveform signal to identify a set of FCCH correlation peaks therein;
   c) for each given FCCH correlation peak within said set of FCCH correlation peaks, generating data representing time-of-arrival and power level for the given FCCH correlation peak, and adding said data to a data file;
   d) determining whether any FCCH correlation peak of the set satisfies a certain detection threshold and, if not, then repeating at least some of steps a) to d);
   e) for at least one given FCCH correlation peak within said set of FCCH correlation peaks that satisfies the FCCH threshold, scheduling SCH burst decoding operations for a time window derived from the time-of-arrival of the given FCCH correlation peak;
   f) performing SCH burst detection and decoding operations on said signals during each time window scheduled in e) to thereby identify BSIC data and RFN data encoded in a given SCH burst detected within said signal, and adding time-of-arrival data, said BSIC data and a frame number data based on said RFN data for the given SCH burst to the data file; and
   g) for each given SCH burst successfully detected and decoded in f), identifying a plurality of time-of-arrival windows within the 51-multiframe based upon the time-of-arrival data and frame number data of the given SCH burst, and updating the data file to associate the BSIC data and frame number data for the given SCH burst with the power level data for each FCCH correlation peak whose time-of-arrival falls within said plurality of time-of-arrival windows of the 51-multiframe.

2. A method according to claim 1, further comprising:
   h) for each given SCH training sequence successfully detected in f), updating the time-of-arrival data for the preceding FCCH burst based upon the time-of-arrival of the given SCH burst.

3. A method according to claim 2, further comprising:
   i) for each given SCH burst successfully detected and decoded in f), scheduling BCCH burst detection and decoding operations for a time window derived from the time-of-arrival data and frame number data of the given SCH burst;
   j) performing BCCH burst detection and decoding operations on said signals during the time window scheduled in i) to thereby identify BCCH information encoded in a set of BCCH bursts detected within said signal, and adding said BCCH information to the data file; and k) updating the data file to associate the BCCH information identified in j) with data components for the given SCH burst from which the BCCH information is derived.

4. A method according to claim 3, wherein:
the operations in g) update the data file to associate the BCCH information corresponding to the given SCH burst with the power level data for each FCCH correlation peak whose time-of-arrival falls within said plurality of time-of-arrival windows of the 51-multiframe.

5. A method according to claim 4, wherein:
said BCCH information includes a Cell Identifier (CellId), a Location Area Code (LAC), Mobile Network Code (MNC) and Mobile Country Code (MCC) assigned to a given base station transmitting the 51-multiframe signal.

6. A method according to claim 4, wherein:
said plurality of time-of-arrival windows comprise 5 time windows within any 51-multiframe.

7. A method according to claim 3, wherein:
the operations of a) through f) and h), i) and j) are performed as part of a real-time data acquisition and analysis phase, and the operations of g) and k) are performed as part of an of f line data analysis phase.

8. A method according to claim 3, wherein:
the operations of a) through k) are performed as part of a real-time data acquisition and analysis phase.

9. A method according to claim 8, further comprising:
displaying in real-time power level data for each FCCH correlation peak identified in b).

10. A method according to claim 9, further comprising:
updating the display in real-time to display at least one of BSIC data and BCCH information detected and associated with a given FCCH correlation peak along with said power level data for the given correlation peak.

11. A method according to claim 10, further comprising:
updating the display in real-time to display power level data for each detected FCCH correlation peak in accordance with measured changes in said power level data over time.

12. A method according to claim 1, wherein:
said plurality of time-of-arrival windows comprise 5 time windows within the any 51-multiframe.

13. A method according to claim 1, wherein:
time-of-arrival data for a given SCH burst is normalized to the preceding FCCH burst frame.

14. A method according to claim 1, wherein:
time-of-arrival data for respective FCCH bursts and SCH bursts in addition to said plurality of time-of-arrival windows are defined by a timing reference signal with a period of one or multiple GSM 51-multiframes.

15. A method according to claim 14, wherein
said timing reference signal is generated internally and synchronized to a GPS signal.

16. A method according to claim 1, wherein:
data generated from the operations of a) through f) and j) is accessed for post-processing analysis.

17. A method according to claim 16, wherein:
said post-processing analysis performs at least one of network optimizations, frequency planning, co-channel interference analysis, and adjacent-channel interference analysis.

18. A method according to claim 1, wherein:
the data representing power level for the given FCCH correlation peak is a measure of absolute power and relative power of the given FCCH correlation peak.

19. A method according to claim 1, wherein:
the operations in e) are performed for each FCCH correlation peak that crosses a certain relative power threshold.

20. A method according to claim 1, wherein:
the time window of e) encompasses one frame after the time-of-arrival of the given FCCH correlation peak.

21. A data analysis tool that measures and identifies base stations transmitting on the same channel, thus interfering with each other, in a GSM cellular wireless network wherein a plurality of base stations each transmit a 51-multiframe signal including a plurality of FCCH bursts, a plurality of SCH bursts and a plurality of BCCH bursts, the data analysis tool comprising:
a) means for receiving signals within the intended coverage zone of the GSM cellular wireless network;
b) means for correlating the received signals with an FCCH burst waveform signal to identify a set of FCCH correlation peaks therein;
c) means for generating data representing time-of-arrival and power level for each given FCCH correlation peak within said set of FCCH correlation peaks, and adding said data to a data file;
d) means for determining whether any FCCH correlation peak of the set satisfies a certain detection threshold and, if not, then repeating at least some of steps a) to d);
e) means for scheduling SCH burst decoding operations for a time window derived from the time-of-arrival for at least one given FCCH correlation peak within said set of FCCH correlation peaks;
f) means for performing SCH burst detection and decoding operations on said signals during each time window scheduled e) by to thereby identify BSIC data and RFN data encoded in a given SCH burst detected within said signal, and for adding time-of-arrival data, said BSIC data and a frame number data based upon said RFN data for the given SCH burst to the data file; and
g) means for identifying a plurality of time-of-arrival windows within the 51-multiframe of each given SCH burst successfully detected and decoded by f), and for updating the data file to associate the BSIC data with the power level data for each FCCH correlation peak whose time-of-arrival falls within said plurality of time-of-arrival windows within the 51-multiframe of the given SCH burst.

22. A data analysis tool according to claim 21, further comprising:
h) means for updating the time-of-arrival data for a given FCCH burst based upon time-of-arrival of a training sequence of a given SCH burst detected by f).

23. A data analysis tool according to claim 22, further comprising:
i) means for scheduling BCCH burst detection and decoding operations for a time window derived from the time-of-arrival and frame number for each given SCH burst successfully detected and decoded by f);
j) means for performing BCCH burst detection and decoding operations on said signals during the time window scheduled by i) to thereby identify BCCH information encoded in a set of BCCH bursts detected within said signal, and adding said BCCH information to the data file; and
k) means for updating the data file to associate the BCCH information identified by j) with data components for the given SCH burst from which the BCCH information is derived.

24. A data analysis tool according to claim 23, wherein:
The means g) is adapted to update the data file to associate the BCCH information corresponding to the given SCH burst with the time-of-arrival data for each FCCH correlation peak whose time-of-arrival falls within said plurality of time-of-arrival windows within the 51-multiframe of the given SCH burst.

25. A data analysis tool according to claim 24, wherein:
said BCCH information includes a Cell Identifier (CellId), Location Area Code (LAC), Mobile Network Code (MNC) and Mobile Country Code (MCC) assigned to a given base station transmitting the 51-multiframe signal.

26. A data analysis tool according to claim 24, wherein:
said plurality of time-of-arrival windows comprise 5 time windows within any 51-multiframe.

27. A data analysis tool according to claim 23, wherein:
the means a) through f) and h), i) and j) perform real-time data acquisition and analysis operations, and the means g) and k) performs offline data analysis operations.

28. A data analysis tool according to claim 23, wherein:
the means a) through k) perform real-time data acquisition and analysis operations.

29. A data analysis tool according to claim 28, further comprising:
means for displaying in real-time power level data for each FCCH correlation peak identified by b).

30. A data analysis tool according to claim 29, further comprising:
means for updating the display in real-time to display at least one of BSIC data and BCCH information detected and associated with a given FCCH correlation peak along with said power level data for the given correlation peak.

31. A data analysis tool according to claim 30, further comprising:
means for updating the display in real-time to display power level data for each detected FCCH correlation peak in accordance with measured changes in said power level data over time.

32. A data analysis tool according to claim 21, wherein:
said plurality of time-of-arrival windows comprise 5 time windows within any 51-multiframe.

33. A data analysis tool according to claim 21, wherein:
time-of-arrival data for a given SCH burst is normalized to the preceding FCCH burst frame.

34. A data analysis tool according to claim 21, wherein:
time-of-arrival data for respective FCCH bursts and SCH bursts in addition to said plurality of time-of-arrival windows are defined by a timing reference signal with a period of one or multiple GSM 51-multiframes.

35. A data analysis tool according to claim 34, further comprising:
a GPS unit that generates a GPS signal; and
wherein said timing reference signal is synchronized to said GPS signal.

36. A data analysis tool according to claim 35, further comprising: an
oscillator circuit for generating a timing signal that is synchronized to said GPS signal; and
wherein said timing reference signal is derived from said timing signal generated by said oscillator circuit.

37. A data analysis tool according to claim 21, wherein:
data generated from by means a) through f) and j) is stored for subsequent access for post-processing analysis.

38. A data analysis tool according to claim 37, wherein:
said post-processing analysis performs at least one of network optimizations, frequency planning, co-channel interference analysis, and adjacent-channel interference analysis.

39. A data analysis tool according to claim 21, wherein:
the data representing power level for the given FCCH correlation peak is a measure of absolute power and relative power of the given FCCH correlation peak.

40. A data analysis tool according to claim 21, wherein:
the means e) performs operations for each FCCH correlation peak that crosses a certain relative power threshold.

41. A data analysis tool according to claim 21, wherein:
the time window of e) encompasses one frame after the time-of-arrival of the given FCCH correlation peak.

42. A method for measurement and identification of base stations transmitting on the same channel, thus interfering with each other, in a cellular wireless network wherein downstream signals from base stations to users are communicated in frames and include fixed signal waveforms and information that identifies base stations, the method comprising:
a) receiving signals within the intended coverage zone of the cellular wireless network;
b) detecting known signal waveforms in the received signals;
c) for each detected signal waveform, logging time-of-arrival and power level data for the detected signal waveform to a data file;
d) determining whether any detected signal waveforms satisfies a certain detection threshold and, if not, then repeating at least some of steps a) to d);
e) detecting and decoding data associated with each detected signal waveform that satisfies the detection threshold where said detected and decoded data identifies a base station in the cellular wireless network; and
f) identifying a plurality of time-of-arrival windows based on data generated in e), and updating the data file to associate the data generated in e) with power level data of detected signal waveforms whose time-of-arrival falls within said plurality of time-of-arrival windows.

43. A method according to claim 42, further comprising:
g) detecting and decoding additional information that uniquely identifies the base station, and adding said additional information to the data file; and
h) updating the data file to associate the additional information identified in g) with data components for corresponding detected signal waveforms.

44. A method according to claim 43, wherein:
the operations of a) through ) and g) are performed as part of a real-time data acquisition and analysis phase, and the operations of f) and h) are performed as part of an offline data analysis phase.

45. A method according to claim 43, wherein:
the operations of a) through h) are performed as part of a real-time data acquisition and analysis phase.

46. A method according to claim 45, further comprising:
displaying in real-time power level data for each signal waveform detected in b).

47. A method according to claim 46, further comprising:
updating the display in real-time to display base station identification data detected and associated with a given signal waveform along with said power level data for the given signal waveform.

48. A method according to claim 47, further comprising:

updating the display in real-time to display power level data for each detected signal waveform in accordance with measured changes in said power level data over time.

49. A method according to claim 42, wherein:

the power level data for the detected signal waveform is a measure of absolute power and relative power of the detected signal waveform.

50. A method according to claim 42, wherein:

the detected signal waveform comprises one of a synchronization waveform and a training sequence waveform transmitted by a base station.

51. A method according to claim 42, wherein time of arrival is referenced to a timing reference signal generated internally and synchronized to a GPS signal; sad timing referenced signal having period of one of multiple frames.

52. A method according to claim 42, wherein:

data generated from the operations of a) through g) is accessed for post-processing analysis.

53. A method according to claim 52, wherein:

said post-processing analysis performs at least one of network optimizations, frequency planning, co-channel interference analysis, and adjacent-channel interference analysis.

* * * * *